United States Patent
Baumgartner et al.

(10) Patent No.: US 7,629,875 B2
(45) Date of Patent: Dec. 8, 2009

(54) METHOD TO REPORT LF REMOTE SIGNAL STRENGTH VIA A RF LINK TO AN ELECTRONIC CONTROL UNIT

(75) Inventors: Josef Baumgartner, Voels (AT); Gerald Ostrander, Davison, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 644 days.

(21) Appl. No.: 11/361,791

(22) Filed: Feb. 24, 2006

(65) Prior Publication Data
US 2006/0208854 A1 Sep. 21, 2006

Related U.S. Application Data

(60) Provisional application No. 60/663,523, filed on Mar. 18, 2005.

(51) Int. Cl.
*B60R 25/10* (2006.01)
*H04B 1/38* (2006.01)
*H04B 1/02* (2006.01)
*G08B 1/08* (2006.01)

(52) U.S. Cl. ............ 340/426.13; 340/5.61; 340/5.62; 340/5.64; 340/426.15; 340/539.14

(58) Field of Classification Search ............... 340/5.61
See application file for complete search history.

(56) References Cited

U.S. PATENT DOCUMENTS

| | | | | |
|---|---|---|---|---|
| 6,034,593 | A * | 3/2000 | Chase et al. | 340/426.36 |
| 6,218,932 | B1 | 4/2001 | Stippler | |
| 6,317,035 | B1 * | 11/2001 | Berberich et al. | 340/426.13 |
| 6,538,560 | B1 * | 3/2003 | Stobbe et al. | 340/5.72 |
| 6,570,486 | B1 * | 5/2003 | Simon et al. | 340/5.1 |
| 7,292,134 | B2 * | 11/2007 | Conner et al. | 340/5.64 |
| 2005/0046546 | A1 * | 3/2005 | Masudaya | 340/5.61 |
| 2006/0114100 | A1 * | 6/2006 | Ghabra et al. | 340/5.61 |

FOREIGN PATENT DOCUMENTS

| | | |
|---|---|---|
| DE | 102 02 330 A1 | 7/2003 |
| EP | 1 184 236 A | 3/2002 |
| WO | WO 2004/107276 A | 12/2004 |

OTHER PUBLICATIONS

PCT International Search Report, dated Jul. 25, 2006.

* cited by examiner

*Primary Examiner*—Daniel Wu
*Assistant Examiner*—Fekadeselassie Girma

(57) ABSTRACT

A passive start and entry (PASE) system monitors a signal strength of a LF signal detected by a fob. The fob reports the signal strength back to an electronic control unit using an RF signal. The electronic control unit compares the signal strength to a predetermined threshold. If the signal strength is below the threshold, the electronic control unit determines that the fob may not be receiving the LF transmission due to interference and takes corrective action.

16 Claims, 2 Drawing Sheets

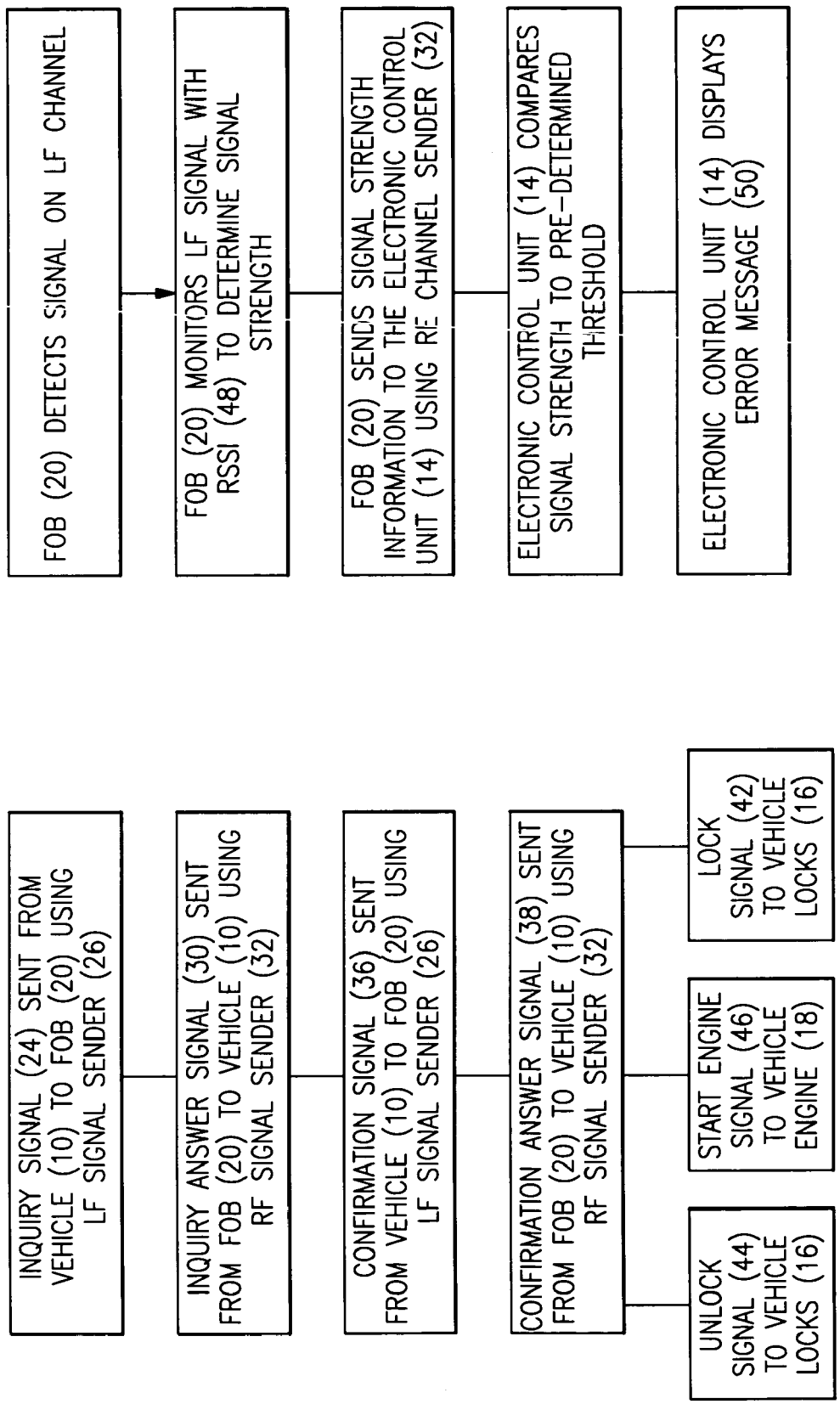

METHOD TO REPORT LF REMOTE SIGNAL STRENGTH VIA A RF LINK TO AN ELECTRONIC CONTROL UNIT

REFERENCE TO RELATED APPLICATIONS

The present invention claims the benefit of U.S. Provisional Patent Application No. 60/663,523, filed Mar. 18, 2005.

BACKGROUND OF THE INVENTION

This invention relates generally to a passive start and entry (PASE) system that monitors a LF frequency used to transmit communications between the PASE system and a fob. More particularly, the PASE system sends a signal from the fob to a vehicle to alert a user that noise on the LF frequency may be interfering with the PASE system and the fob communications.

PASE systems perform unlock and start a vehicle without requiring a passenger to have a key. The PASE system communicates an inquiry signal to a fob that the passenger carries. The fob transmits a confirmation signal back to the vehicle, and vehicle doors are unlocked or the vehicle is started when the signal is confirmed. When an occupant leaves the vehicle, the PASE system will relock the vehicle doors when the fob is a predetermined distance from the vehicle.

Currently, the inquiry signal from the PASE system is sent from the vehicle to the fob using an LF signal. The fob receives the LF signal and responds with an inquiry answer that is a RF signal. LF signals are vulnerable to noise that can interfere with the inquiry signal being received by the fob. If no inquiry signal is received, the fob does not perform the requested function. The user would receive an inaccurate "No Fob Detected" message as a result. This problem commonly occurs as a result of certain cell phone chargers or other communication devices that operate at a similar frequency to the PASE system, creating LF noise that interferes with the PASE system signals.

It is therefore desirable to develop and design an improved communication system for passive start end entry systems.

SUMMARY OF THE INVENTION

An example passive start and entry (PASE) system according to the present invention monitors a LF channel to detect communication interference between a vehicle and a fob. The PASE system is located in the vehicle and includes an electronic control unit that controls the PASE system. The PASE system is connected to vehicle locks and a vehicle engine. The PASE system includes a fob that a passenger carries on their person.

The vehicle sends an inquiry signal using an low frequency (LF) channel from the vehicle to check for any fob within proximity to the vehicle. The fob sends an inquiry answer back to the electronic control unit using a radio frequency (RF) channel. A confirmation signal and confirmation answer is sent in the same manner. When a confirming transmission is received, the electronic control unit sends an unlock signal, a lock signal or a start engine signal as needed.

The fob includes a receive signal strength indicator (RSSI) that monitors the signal strength of a detected LF signal on the LF channel. The fob reports the signal strength back to the electronic control unit using the RF channel. Upon receipt of the signal strength, the electronic control unit compares the signal strength to a predetermined threshold. If the signal strength is below the threshold, the electronic control unit determines that the fob may not be receiving the LF transmission on the LF channel due to interference and takes corrective action, such as alerting the user.

These and other features of the present invention can be best understood from the following specification and drawings, the following of which is a brief description.

BRIEF DESCRIPTION OF THE DRAWINGS

FIG. 2 is a flowchart illustrating a communication process of an example passive start and entry system of the present invention; and FIG. 3 illustrates an example signal strength confirmation process for the passive start and entry system of the present invention.

DETAILED DESCRIPTION OF THE PREFERRED EMBODIMENT

Figure 1:
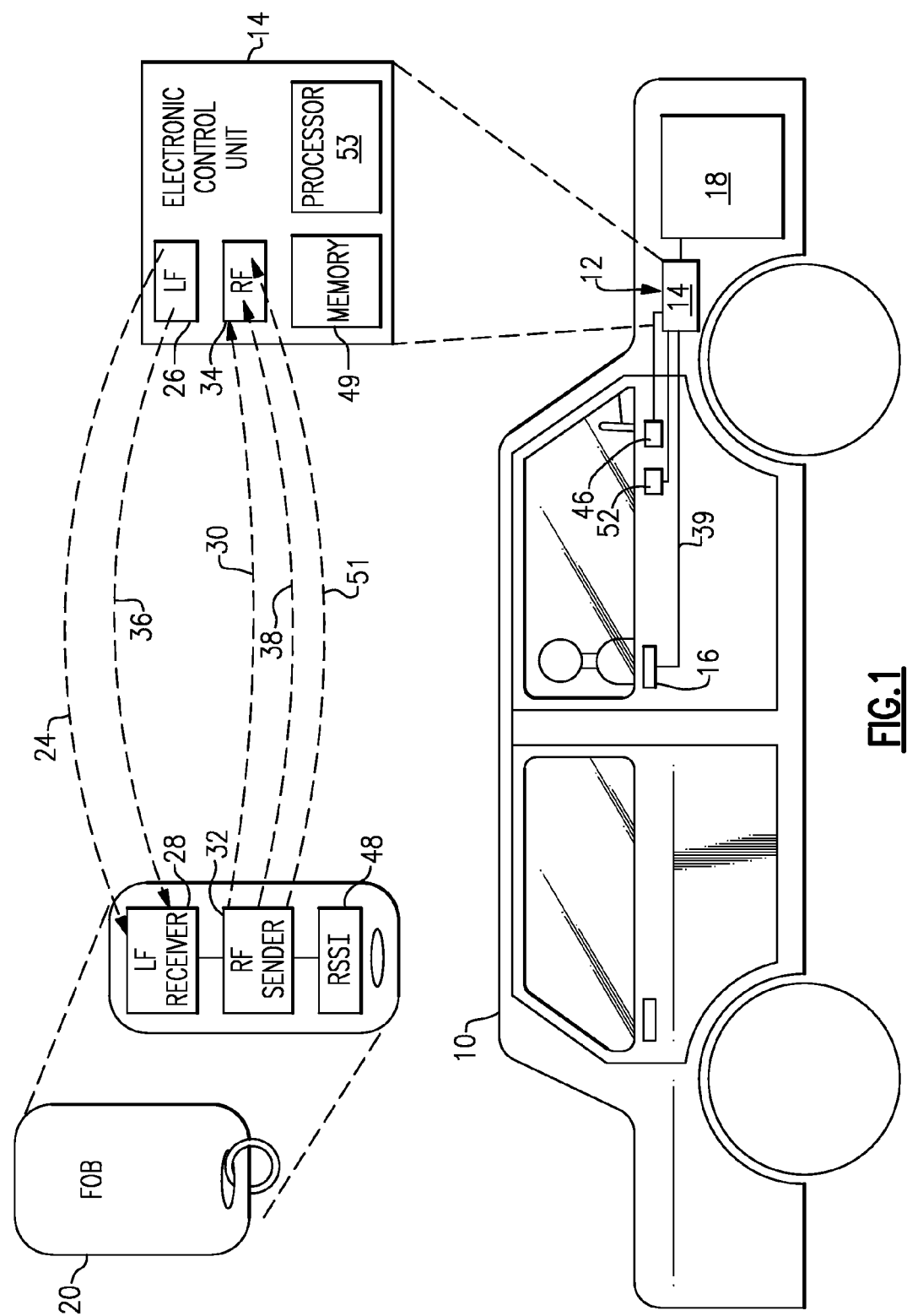
FIG. 1 is a schematic illustration of a vehicle utilizing a passive start and entry system of the present invention.

FIG. 1 illustrates a vehicle 10 having an example passive start and entry (PASE) system 12. The PASE system 12 includes an electronic control unit 14 for controlling the PASE system 12. The electronic control unit 14 is connected to vehicle locks 16 and a vehicle engine 18. The PASE system 12 includes a fob 20. The fob 20 may be any device that a passenger may carry on their person and may be shaped like a traditional key fob, or as card that may be carried within a purse or wallet.

FIG. 2 illustrates a communication process of an example PASE system 12 of the present invention. The electronic control unit 14 sends an inquiry signal 24 from the vehicle 10 to check for transmission from any fob 20 within proximity to the vehicle 10. The communications from the electronic control unit 14 to the fob 20 are sent using an low frequency (LF) signal on an LF channel. The electronic control unit 14 includes an LF sender 26 that sends the inquiry signal 24. The transmission of the inquiry signal 24 may occur periodically or may be initiated by the passenger, such as by touching a vehicle door handle.

The fob 20 includes an LF receiver 28 that receives communications from the electronic control unit 14. When the LF receiver 28 receives the inquiry signal 24, the fob 20 sends an inquiry answer signal 30 back to the electronic control unit 14. The inquiry answer signal 30 from the fob 20 to the electronic control unit 14 is sent using a radio frequency (RF) signal on an RF channel. The fob 20 includes an RF signal sender 32 that sends the inquiry answer signal 30, and the electronic control unit 14 includes an RF signal receiver 34 to receive the inquiry answer signal 30 signal from the fob 20.

Upon receipt of the inquiry answer signal 30, the LF sender 26 of the electronic control unit 14 sends a confirmation signal 36 to the fob 20. The fob 20 confirms it is the correct fob 20 for the vehicle 10 by sending a confirming answer signal 38 back to the electronic control unit 14 using the RF sender 32. When the confirming answer signal 38 is received, the electronic control unit 14 sends an unlock signal 40 to the vehicle locks 16 through an electrical connection 39. Similarly, the electronic control unit 14 can send a lock signal 42 to the vehicle locks 16 when the electronic control unit 14 determines that the fob 20 is no longer within a predetermined distance of the vehicle 10 or can send a start engine signal 44 when a passenger presses a start engine button 46.

FIG. 3 illustrates an example signal strength confirmation process of the present invention. The fob 20 includes a receive signal strength indicator 48. The receive signal strength indicator 48 in the fob 20 monitors the designated LF channel that the vehicle 10 uses to transmit information. When the fob 20 detects a noise, from any source, on the LF channel, the signal strength indicator 48 measures the LF signal strength. The RF signal sender 32 of the fob 20 then communicates the LF signal strength to the electronic control unit 14. The fob 20 sends a strength signal 51 to the RF signal receiver 34 of the electronic control unit 14 using the RF signal sender 32 for transmission of the LF signal strength information.

Upon receipt of the strength signal 51 by the electronic control unit 14, a processing unit 53 within the electronic control unit 14 compares the LF signal strength to a predetermined signal strength threshold stored in a memory 49 of the ECU 14. If the LF signal strength is below the predetermined threshold, the processing unit 53 determines that due to interference, the fob 20 is not receiving any LF transmissions that may have been sent from the vehicle. The electronic control unit 14 then takes corrective action, such as displaying an error message 50, or temporarily turning off systems operating at the same or similar frequencies. Once corrective action is taken, the PASE system 12 continues the normal communication method as described in FIG. 2.

One corrective action the passenger may take when an error message 50 is displayed is to insert the fob 20 into a fob receiver 52 to enhance the LF and RF channel communications. The fob receiver 52 is a pocket for receiving the fob 20. The fob receiver 52 is connected to the electronic control unit 14 to allow the electronic control unit 14 and the fob 20 to communicate. When the fob 20 is in the fob receiver 52, the LF channel sender and receiver are in close proximity increasing the signal strength and reducing interference from other systems.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A passive start and entry system comprising:
    an electronic control unit including a first channel sender to send a first low frequency signal on a first channel; and
    a fob including a first channel receiver to receive the first low frequency signal and a second channel sender to a send a second signal responsive to the first low frequency signal to the electronic control unit on a second channel having a different frequency than the first channel, and a signal strength indicator to measure a signal strength of the first low frequency signal, wherein the second signal responsive to the first low frequency signal includes information indicative of the received signal strength of the first low frequency signal from the first channel sender; and the electronic unit prompts display of a message within a vehicle cabin when the strength of the first signal is below a predetermined threshold.

2. The system of claim 1, wherein the electronic control unit includes a second channel receiver to receive the second signal from the fob.

3. The system of claim 1, wherein the second signal includes a strength of the first signal.

4. The system of claim 1, wherein a display displays a warning message when the strength of the first signal is below a predetermined threshold.

5. The system of claim 1, wherein the first signal is a low frequency signal and the first channel in a low frequency channel and the second signal is a radio frequency signal and the second channel is a radio frequency channel.

6. The system of claim 1, wherein the electronic control unit is located within a vehicle.

7. A method of communicating with a vehicle passive entry and start system comprising:
    sending a first low frequency signal from an electronic control unit to a fob on a first channel;
    monitoring the first channel with a signal strength indicator located in the fob;
    Sending a second signal from the fob responsive to the first low frequency signal to the electronic control unit on a second channel having a different frequency then the first channel, wherein the second signal indicates a signal strength of the first low frequency signal; and
    prompting the electronic unit to display a message within a vehicle cabin when the strength of the first signal is below a predetermined threshold.

8. The method of claim 7, further comprising the step of comparing the signal strength of the first signal to a predetermined threshold.

9. The method of claim 7, wherein said step of sending the first signal further includes initiating the first signal by touching a door handle.

10. The method of claim 7, wherein said step of sending the first signal further includes initiating the first signal at predetermined intervals of time.

11. The method of claim 7, further comprising the step of displaying a warning message based on said signal strength of the first signal.

12. The method of claim 7, wherein said the first channel is a low frequency channel and said the second channel is a radio frequency channel.

13. A method of conforming a signal strength with a vehicle passive entry and start system comprising:
    sending a first low frequency signal from an electronic control unit to a fob;
    monitoring a first channel with a signal strength indicator located in the fob;
    sending a second signal from the fob to an electronic control unit using a second channel having a different frequency than the first channel;
    determining a signal strength of the first low frequency signal;
    comparing the signal strength of the first low frequency signal to a predetermined threshold; and
    displaying a warning message within the vehicle based on indicated signal strength.

14. The method of claim 13, wherein said step of sending the first signal further includes initiating the signal by touching a door handle.

15. The method of claim 13, wherein said step of sending the first signal further includes initiating the signal at predetermined intervals of time.

16. The method of claim 13, wherein said step of monitoring the first signal further includes monitoring a low frequency channel and said step of sending the second signal further includes sending the second signal a radio frequency channel.

* * * * *

UNITED STATES PATENT AND TRADEMARK OFFICE
CERTIFICATE OF CORRECTION

PATENT NO. : 7,629,875 B2  Page 1 of 1
APPLICATION NO. : 11/361791
DATED : December 8, 2009
INVENTOR(S) : Baumgartner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Twenty-first Day of December, 2010

David J. Kappos
*Director of the United States Patent and Trademark Office*